United States Patent [19]

Oakes

[11] 4,127,355
[45] Nov. 28, 1978

[54] WOOD BIT

[76] Inventor: Harry C. Oakes, Academy St., Wyoming, N.Y. 14591

[21] Appl. No.: 830,861

[22] Filed: Sep. 6, 1977

[51] Int. Cl.$^2$ ............................................. B23B 51/00
[52] U.S. Cl. ..................................... 408/225; 408/220
[58] Field of Search ............... 408/199, 210, 213, 216, 408/219, 220, 223, 224, 225

[56] References Cited

U.S. PATENT DOCUMENTS

| | | | |
|---|---|---|---|
| 2,897,696 | 8/1959 | Tisserant | 408/225 |
| 3,564,945 | 2/1971 | Bradley | 408/224 |

*Primary Examiner*—Travis S. McGehee
*Attorney, Agent, or Firm*—Christel & Bean

[57] ABSTRACT

A drill bit for drilling holes of a given diameter in wood or similar material comprising a drill body having a series of stepped cylindrical portions increasing in diameter from the small entry end of the drill to the full diameter of the hole to be drilled whereby the drill body is of generally conical shape. Each of the cylindrical portions extends in a helical direction, and a single flute extends generally lengthwise of the drill body to provide cutting edges for the cylindrical portions and a discharge path for material cut from the workpiece. The flute extends generally parallel to the axis of the drill and forms approximately a right angle in transverse cross section, occupying approximately one fourth of the cross sectional area of the drill body. A male thread extends helically along each of the cylindrical portions excepting the largest full diameter portion and projects radially outwardly from each of such portions to engage the walls of the workpiece and thus feed the drill through the workpiece. The several cylindrical portions and the male threads thereof extend at a common helix angle.

8 Claims, 3 Drawing Figures

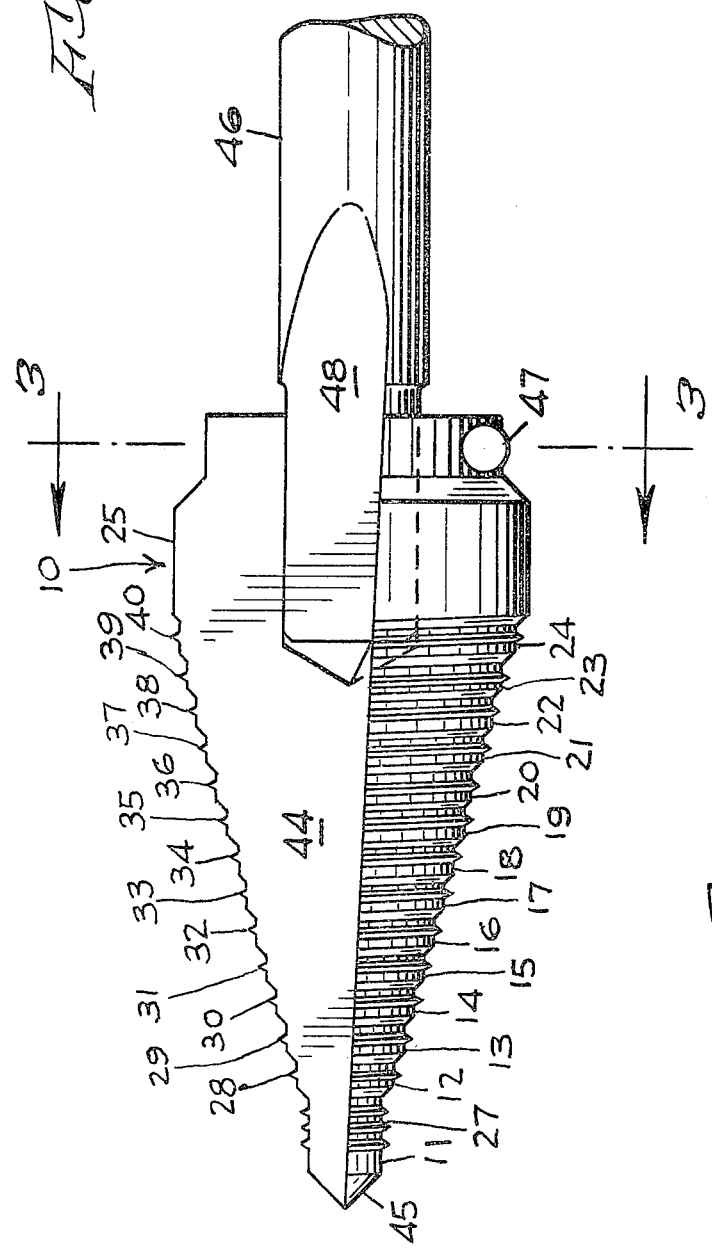
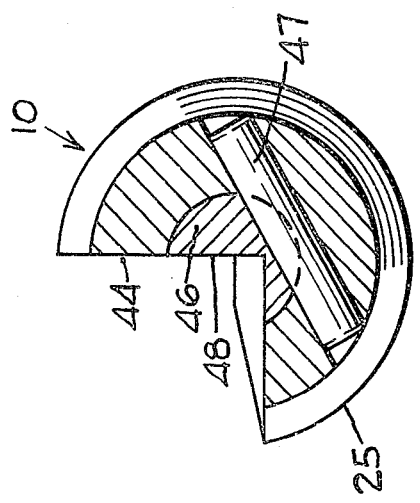
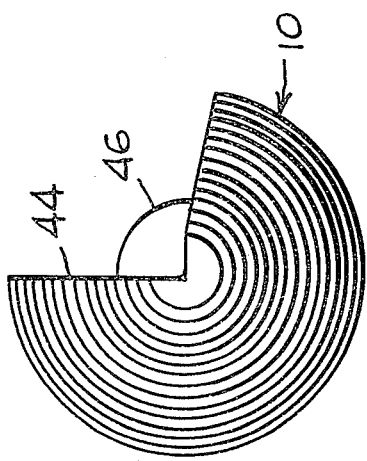

WOOD BIT

BACKGROUND OF THE INVENTION

This invention relates to a novel drill bit for drilling in wood and similar materials.

Conventional wood bits are so designed that, apart from the small screw at the end thereof for engaging the bit with the work, the drill bit immediately begins the drilling of a hole of the full desired diameter. This requires a very substantial pressure to be exerted manually by the user. A further problem is encountered when it is desired to drill a larger hole where a smaller hole already exists so that the small feed screw at the end of the conventional wood bit is ineffective in feeding the drill into the work. A still further problem exists in cases where the wood bit is apt to encounter nails, metal lathing, plaster or other material which harmfully affects the usual knife edge portions provided at the tip end of conventional wood bits.

My prior U.S. Pat. No. 3,758,222 dated Sept. 11, 1973 shows a conical drill bit which is designed to produce holes of various sizes in relatively thin sheets, usually metal sheets. The bit of the present invention is for a substantially different purpose but bears some physical resemblance to the bit of my prior patent in its generally stepped conical form.

SUMMARY OF THE INVENTION

The drill bit of the present invention is provided with a relatively small diameter screw formation at its tip end for entering the work and comprises a series of cylindrical helical stepped formations increasing in diameter to the large end of the bit. This bit is not intended to drill holes of various diameters but only a hole of a single diameter corresponding to the final or largest diameter step of the generally conically shaped drill. By this means the wood of the hole to be drilled is separated from the work piece in gradual steps which greatly facilitates hand drilling.

Furthermore, and of greater importance, each step of the wood bit of the present invention is provided with a generally helically extending external male thread formation which cuts a female thread in the adjacent wall of the hole being drilled and thus feeds the drill progressively through the work piece by this threading action. This very significantly reduces the pressure which the user would ordinarily have to exert against a power drill or brace in an axial direction to force the drill through the workpiece. Also, since the thread formations are provided at each step of the drill bit excepting the final full diameter step, the bit is positively drawn through the workpiece after the threaded tip end of the bit has passed through the work.

BRIEF DESCRIPTION OF THE DRAWING

FIG. 1 is a general side elevational view of one form of the drill bit of the present invention;

FIG. 2 is an end view thereof viewed from the left end of FIG. 1; and

FIG. 3 is a cross-sectional view on the line 3—3 of FIG. 1.

DESCRIPTION OF THE ILLUSTRATED EMBODIMENT

In the drill bit illustrated in the drawing and described in detail therein by way of example a drill body which is generally conical is designated generally by the reference numeral 10 and has a pointed cylindrical portion 11 at its small end and a series of helically extending cylindrical land portions of increasing diameter designated 12 through 24 in FIG. 1 and terminating at the large end of the drill in a land portion 25 which determines the full diameter of the hole to be drilled by use of the present tool.

It will be noted that each of the successive cylindrical portions 11 through 24 is joined to the adjacent larger cylindrical portion by a bevel formation. The successive cylindrical lands 12 through 24 each have projecting therefrom a thread formation which lies about midway along each land and which in the present form likewise extends helically about the drill body at the same helix angle as that of the successive lands 12 through 24.

The leading end portion of the drill bit illustrated in FIG. 1 is threaded as at 27 to facilitate entry of the drill bit into the work, and the projecting thread formations of the several cylindrical lands 12 through 24 of increasing diameter are designated by the reference numerals 28 through 40, respectively.

For convenience, economy and accuracy in manufacture, and facility in drilling operation, the helix angles of the several cylindrical portions 12 through 24 and the helix angles of the thread formation 28 through 40 are all equal. In the form illustrated herein by way of example, each of the adjacent lands is connected to the lands at opposite sides thereof by a bevel formation such as the one designated 42 in FIG. 1.

A single flute formation 43 extends along the drill bit parallel to the axis thereof to provide a face 44 which intersects the peripheries of the several cylindrical drill portions to provide cutting edges. The small end portion 11 is provided with the usual conical drill point formation 45.

It will be noted that the single flute 42 interrupts the periphery of each cylindrical portion at an angle of approximately 90° with its apex lying generally along the axis of the drill body so that each such cylindrical portion has approximately 270° of uninterrupted periphery in contact with the work to maintain accurate concentric bearing of all portions of the drill in the work as the formation of the hole proceeds.

The large end of the drill body 10 is provided with a bore for receiving a shank 46 which is secured to the drill body by a pin 47 which extends through the upper portion of the drill body and through at least a portion of shank 46. A portion of shank 46 is fluted in axial alignment with the flute 44 of the drill body to provide free egress for chips or other material removed from the workpiece.

The drill of the present invention is very useful in the electrical and plumbing arts and in the building and construction arts in drilling through partition walls, and accordingly shanks 46 of various lengths may be provided for interchangeable use depending on the depth of the hole or holes to be drilled.

A preferred embodiment of the present invention has been described herein and illustrated in the accompanying drawings by way of example. However, it is to be understood that numerous modifications thereof may be made without departing from the broad spirit and scope of the invention as defined in the appended claims.

I claim:

1. A drill bit for drilling holes of a given diameter in wood or similar material comprising a generally conical drill body having a series of stepped cylindrical portions increasing in diameter from the small entry end of the drill to the full diameter of the hole to be drilled, each of said cylindrical portions extending in a helical direction, flute means extending generally lengthwise of said drill body to provide cutting edges for said cylindrical portions and a discharge path for material cut from the workpiece, and a male thread extending helically along a plurality of said cylindrical portions and extending radially outwardly therefrom to engage the walls of the workpiece and thus feed the drill through the workpiece.

2. A drill bit according to claim 1 wherein a helically extending male thread is provided along the periphery of each cylindrical portion excepting the final full diameter portion.

3. A drill bit according to claim 1 wherein the helix angles of the several cylindrical portions are equal.

4. A drill bit according to claim 2 wherein the helix angles of the several cylindrical portions are equal.

5. A drill bit according to claim 3 wherein the helix angles of the male threads are equal to the helix angles of said cylindrical portions.

6. A drill bit according to claim 4 wherein the helix angles of the male threads are equal to the helix angles of said cylindrical portions.

7. A drill bit according to claim 1 wherein said flute means comprises a single flute extending axially along said drill body.

8. A drill bit according to claim 7 wherein said flute defines approximately a right angle with its apex generally coincident with the axis of the drill body.

* * * * *